United States Patent
Lin et al.

(10) Patent No.: US 11,503,664 B2
(45) Date of Patent: Nov. 15, 2022

(54) METHOD, SYSTEM AND COMPUTER PROGRAMS FOR THE TRANSMISSION OF INFREQUENT SMALL DATA IN A TELECOMMUNICATION SYSTEM

(71) Applicant: GUANGDONG OPPO MOBILE TELECOMMUNICATIONS CORP., LTD., Guangdong (CN)

(72) Inventors: Huei-Ming Lin, South Yarra (AU); Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 146 days.

(21) Appl. No.: 16/937,273

(22) Filed: Jul. 23, 2020

(65) Prior Publication Data
US 2020/0374963 A1    Nov. 26, 2020

Related U.S. Application Data

(63) Continuation of application No. PCT/CN2019/072564, filed on Jan. 21, 2019.
(Continued)

(51) Int. Cl.
*H04W 4/00* (2018.01)
*H04W 76/25* (2018.01)
(Continued)

(52) U.S. Cl.
CPC ............ *H04W 76/25* (2018.02); *H04W 8/08* (2013.01); *H04W 48/16* (2013.01); *H04W 48/18* (2013.01); *H04W 76/27* (2018.02)

(58) Field of Classification Search
CPC ..... H04W 76/25; H04W 8/08; H04W 786/27; H04W 48/16; H04W 48/18
(Continued)

(56) References Cited

U.S. PATENT DOCUMENTS 10,932,168 B2 * 2/2021 Yang ................. H04W 36/0055
10,986,679 B2 * 4/2021 Cheng ..................... H04W 4/90
(Continued)

FOREIGN PATENT DOCUMENTS

CN    102340754 A    2/2012
CN    103731808 A    4/2014
(Continued)

OTHER PUBLICATIONS

China Mobile et al. "Solution on infrequent small data transmission in efficient way" S2-180218 SA WG2 Meeting #125; Gothenburg, Sweden; Jan. 22-26, 2018. 3 pages.
(Continued)

*Primary Examiner* — Marceau Milord
(74) *Attorney, Agent, or Firm* — Perkins Coie LLP

(57) ABSTRACT

A method of performing communication in a telecommunication system including a user equipment (20), a radio access network (30), an access and mobility management function (40) and a user plane function (60), comprises the steps of:

at the access and mobility management function (40), receiving from the user equipment (20) a NAS packet data unit, PDU, carrying uplink data, wherein the uplink data includes infrequent small data;

at the access and mobility management function (40), after receiving the NAS message from the user equipment, transmitting the uplink data to the user plane function (60).

13 Claims, 3 Drawing Sheets

Related U.S. Application Data

(60) Provisional application No. 62/632,565, filed on Feb. 20, 2018.

(51) Int. Cl.
*H04W 76/27* (2018.01)
*H04W 8/08* (2009.01)
*H04W 48/16* (2009.01)
*H04W 48/18* (2009.01)

(58) Field of Classification Search
USPC .............................. 370/329, 328, 315, 331
See application file for complete search history.

(56) References Cited

U.S. PATENT DOCUMENTS

| | | | | |
|---|---|---|---|---|
| 11,064,557 | B2* | 7/2021 | Feng | H04W 76/12 |
| 2015/0271093 | A1* | 9/2015 | Cui | H04W 4/70 |
| | | | | 370/329 |
| 2016/0105915 | A1* | 4/2016 | Zhang | H04W 48/12 |
| | | | | 370/329 |
| 2017/0201959 | A1* | 7/2017 | Deng | H04W 60/00 |
| 2018/0007557 | A1* | 1/2018 | Lee | H04L 63/0823 |
| 2018/0324631 | A1* | 11/2018 | Jheng | H04W 28/0268 |
| 2018/0324663 | A1* | 11/2018 | Park | H04W 36/0069 |
| 2018/0324869 | A1* | 11/2018 | Phuyal | H04W 72/14 |
| 2019/0090123 | A1* | 3/2019 | Abraham | H04L 67/14 |
| 2019/0090298 | A1* | 3/2019 | Abraham | H04W 76/27 |
| 2019/0174566 | A1* | 6/2019 | Cheng | H04W 4/90 |
| 2019/0200414 | A1* | 6/2019 | Abraham | H04W 76/27 |
| 2021/0250757 | A1* | 8/2021 | Wang | H04W 8/26 |

FOREIGN PATENT DOCUMENTS

| | | | | |
|---|---|---|---|---|
| CN | 104969578 | A | | 10/2015 |
| CN | 106961722 | A | | 7/2017 |
| CN | 107005919 | A | | 8/2017 |
| EP | 3496465 | A1 * | 6/2019 | ............ H04W 24/02 |
| EP | 3678448 | A1 * | 7/2020 | ............ H04W 60/00 |
| EP | 3713370 | A1 * | 9/2020 | .......... H04W 68/005 |
| EP | 3849103 | A1 * | 7/2021 | ............ H04B 7/2606 |
| EP | 3920656 | A1 * | 12/2021 | |
| EP | 3962131 | A1 * | 3/2022 | |
| EP | 3972347 | A1 * | 3/2022 | |
| WO | 2013040962 | A1 | | 3/2013 |
| WO | 2017027071 | A1 | | 2/2017 |
| WO | 2017134939 | A1 | | 8/2017 |

OTHER PUBLICATIONS

Examination Report for European Application No. 19756938.7 dated Oct. 27, 2021. 4 pages.
Examination Report No. 2 for Australian Application No. 2019224209 dated Oct. 28, 2021. 4 pages.
Notice of Reasons for Refusal for Japanese Application No. 2020-542773 dated Nov. 26, 2021. 10 pages with English translation.
3GPP TR 23.724 V0.1.0 (Jan. 2018)—3rd Generation Partnership Project; Technical Specification Group Services and System Aspects; Study on Cellular IoT support and evolution for the 5G System (Release 16) (21 pages).
Catt. "Solution for infrequent small data transfer through NAS and a direct interface between AMF and UPF" 3GPP SA WG2 Meeting #126 S2-181591, Feb. 13, 2018 (Feb. 13, 2018), the sections 1 and 6.X.
Huawei et al. "Solution for Infrequent Small Data Transfer" 3GPP SA WG2 Meeting #125 S2-180329, Jan. 26, 2018 (Jan. 26, 2018), the sections 1 and 6.
International Search Report dated Apr. 19, 2019 of PCT/CN2019/072564 (2 pages).
3GPP TR 23.724 V0.4.0 (Jun. 2018)—3rd Generation Partnership Project Technical Specification Group Services and System Aspects; Study on Cellular IoT support and evolution for the 5G System (Release 16) (179 pages).
3GPP TS 23.502 V1.0.0 (Sep. 2017)—3rd Generation Partnership Project Technical Specification Group Services and System Aspects; Procedures for the 5G System Stage 2 (Release 15) (165 pages).
EPO, Extended European Search Report for European Patent Application No. 19756938.7, dated Jan. 15, 2021. 10 pages.
Huawei et al. "TS 23.501: Slice and DNN granularity SM subscription data management" 3GPP Draft; S2-178193; 2017, 4 pages.
CIPO, First Examiner's Report for Canadian Application No. 3088463, dated Aug. 16, 2021. 4 pages.
IPA, Examination Report No. 1 for Australian Application No. 2019224209, dated Jul. 16, 2021. 3 pages.
IPI, First Examination Report for Indian Application No. 202017031479, dated Jul. 9, 2021. 6 pages with English translation.
First Office Action for Chinese Application No. 202011563402.4 dated May 27, 2022. 13 pages with English translation.
Decision of Refusal for Japanese Application No. 2020-542773 dated Apr. 15, 2022. 8 pages with English translation.
Examination Report for European Application No. 19756938.7 dated Feb. 22, 2022. 5 pages.
Notice of Acceptance for Australian Application No. 2019224209 dated Feb. 21, 2022. 3 pages.
Office Action for Korean Application No. 10-2020-7022958 dated Aug. 31, 2022. 10 pages with English translation.
Second Office Action for Chinese Application No. 2020115634024 dated Jul. 8, 2022. 13 pages with English translation.

* cited by examiner

METHOD, SYSTEM AND COMPUTER PROGRAMS FOR THE TRANSMISSION OF INFREQUENT SMALL DATA IN A TELECOMMUNICATION SYSTEM

CROSS-REFERENCE TO RELATED APPLICATIONS

The present application is a continuation application of International Application No. PCT/CN2019/072564, filed on Jan. 21, 2019, which claims priority to U.S. provisional application No. 62/632,565, filed on Feb. 20, 2018. The present application claims priority and the benefit of the above-identified applications and the above-identified applications are incorporated by reference herein in their entireties.

TECHNICAL FIELD

The present disclosure relates to a telecommunication method, a telecommunication system and computer programs for performing the related function. More specifically, the present disclosure relates to the transmission of infrequent small data in a telecommunication system, in particular a radio communication system.

BACKGROUND

With the advent of Internet-of-things (IoT) and further generation communication standards and systems, more and more devices are becoming connected to generate and report, convey, share, and/or process data. In this context, it is envisaged that cellular networks may comprise a huge number of small autonomous devices, which typically, more or less infrequently (e.g. once per week to once per minute) transmit and receive only small amounts of data. This kind of traffic pattern is sometimes referred to as "small data" or "infrequent small data". Most of these devices are not associated with humans, but are rather sensors or actuators of different kinds, which communicate with application servers (which configure the devices and receive data from them) within or outside the cellular network. Hence, this type of communication is sometimes referred to as machine-to-machine (M2M) communication. Alternative terms are machine type communication, MTC, devices (MTC devices) or Cellular Internet of Things, CIoT, devices (these terms identifying a subset of the more general term user equipment, UE). It is expected that the number of CIoT devices will increase exponentially while the data size per device will remain small. In some of the usage scenarios, the CIoT devices (e.g. utility meters) may not be mobile throughout their lifetime. UEs used for CIoT can be in fact mobile or nomadic/static.

Furthermore, a new generation of telecommunication system is under development by the 3GPP under the name of 5G System or NR (New Radio). A 5G System is 3GPP system consisting of a 5G Access Network (AN), a 5G Core Network and UEs, as described in 3GPP TS 23.501 v.15.0.0. The known 5G System architecture consists of several network functions (NF) and entities as illustrated at FIG. 1. The network functions of a 5G Core Network includes in particular an Access and Mobility Management Function (AMF), a Session Management Function (SMF), and a User Plane Function (UPF) connected to a Data Network (DN).

The Access and Mobility Management Function (AMF) has the function of controlling signaling between the core network and the device, security for user data, idle-state mobility, and authentication. The functionality operating between the AMF and a mobile device is sometimes referred to as the Non-Access Stratum (NAS), whereas the so-called Access Stratum (AS) handles functionality operating between the mobile device and the RAN.

The Session Management Function (SMF) handles, among other functions, IP address allocation for the User Equipment, control of policy enforcement, and general session-management functions.

The User Plane Function (UPF) is a gateway between the RAN and external networks, such as the Internet or more in general a Data Network (DN). The UPF performs packet routing and forwarding, packet inspection, quality-of-service handling and packet filtering, and traffic measurements. It also serves as an anchor point for (inter-RAT) mobility if necessary.

In the context of 5G, document 3GPP TR 23.724 V0.1.0 discusses how to support identified CioT/MTC functionalities in 5G CN with potential connectivity to WB-EUTRA (eMTC) and/or NB-IoT for 5GS capable devices.

SUMMARY OF THE INVENTION

Technical Problem

In the above context, a problem to be solved in the development of a new generation of telecommunication system is how to efficiently support infrequent data transmission. In particular, a problem to be solved is how to provide solutions to support efficient infrequent small data transmissions for at least low complexity, power constrained, and low data-rate CIoT UEs.

It is therefore an object of the present disclosure to provide a solution to the problem of how to properly handle transmission of infrequent small data in a telecommunication system.

Solution

To meet or at least partially meet the above-mentioned goals, methods, systems, and computer programs according to the disclosure are defined in the appended claims.

In particular, according to an aspect, a method is provided for performing communication in a telecommunication system including a user equipment, a radio access network, an access and mobility management function and a user plane function, the method comprising the steps of:
- at the access and mobility management function, receiving from the user equipment a NAS packet data unit, PDU, carrying uplink data, wherein the uplink data includes infrequent small data;
- at the access and mobility management function, after receiving the NAS message from the user equipment, transmitting the uplink data to the user plane function.

According to a further aspect, the NAS PDU encapsulates a PDU session ID or Single-Network Assistance Slice Selection Information, S-NASSI.

According to a further aspect, the NAS PDU is transmitted by the user equipment to the access and mobility management function via the radio access network, the NAS-PDU being transmitted by the user equipment to the radio access network as part of an RRC message.

According to a further aspect, the NAS PDU includes a PDU session ID and the access and mobility management function, upon receiving the NAS PDU, selects a session management function of the telecommunication system based on the PDU session ID.

According to a further aspect, the access and mobility management function transmits the uplink data to the user plane function via a session management function of the telecommunication system.

According to a further aspect, upon receiving the NAS PDU from the user equipment, the access and mobility management function transmits a PDU session create request to the session management function. Preferably, the PDU session create request includes the uplink data. In an implementation, the PDU session create request contains a PDU session ID, Data Network Name, DNN, and/or Single-Network Assistance Slice Selection Information, S-NASSI. When receiving a PDU session create request including the DNN and the S-NASSI, the session management function selects the user plane function based on the DNN and the S-NSSAI. Upon receiving the PDU session create request, the session management function transmits a session establishment request to the user plane function and simultaneously forwards the uplink data to the user plane function.

According to a further aspect, upon receiving the session establishment request, the user plane function transmits a session establishment response carrying downlink data to the session management function, if downlink data are available. Further, upon receiving the session establishment response, the session management function transmits a PDU session create response carrying the downlink data to the access and mobility management function, if the downlink data are carried in the session establishment response from the user plane function.

According to a further aspect, the access and mobility management function transmits the uplink data to the user plane function via an interface (Nx) between the access and mobility management function and the user plane function.

According to a further aspect, upon receiving the NAS PDU from the user equipment, the access and mobility management function transmits to a session management function of the telecommunication system a PDU session create request to establish a user plane tunnel for a PDU session between the access and mobility management function and the user plane function; the session management function, upon receiving the PDU session create request, establishes a tunnel for a PDU session between the access and mobility management function and the user plane function. In an implementation, the PDU session create request includes an AMF address and DL Tunnel Endpoint identifier (TEID) information, and the method further comprises the steps of: (i) at the session management function, upon receiving the PDU session create request, transmitting the AMF address and the DL TEID to the user plane function, (ii) at the user plane function, in response to receiving the AMF address and the DL TEID from the session management function, transmitting a UL TEID of the user plane function to the session management function, and (iii) at the session management function, upon receiving the UL TEID from the user plane function, transmitting the UL TEID to the access and mobility management function. Upon receiving the UL TEID from the session management function, the access and mobility management function transmits the uplink data to the user plane function over the established tunnel for a PDU session between the access and mobility management function and the user plane function.

According to an implementation, the telecommunication system is a 5G system.

Thanks to the proposed methods, it is possible to achieve a transmission of infrequent small data in a mobile communication system with resource efficient system signalling load (especially over the radio interface), a satisfactory level of security mechanisms for CIoT in 5G system and reduced level of power consumption for UEs used for CIoT in 5GS system.

BRIEF DESCRIPTION OF THE DRAWINGS

Implementations of the present disclosure, which are presented for better understanding the inventive concepts and which are not to be seen as limiting the disclosure, will now be described with reference to the figures in which.

DETAILED DESCRIPTION OF IMPLEMENTATIONS

Figure 1:
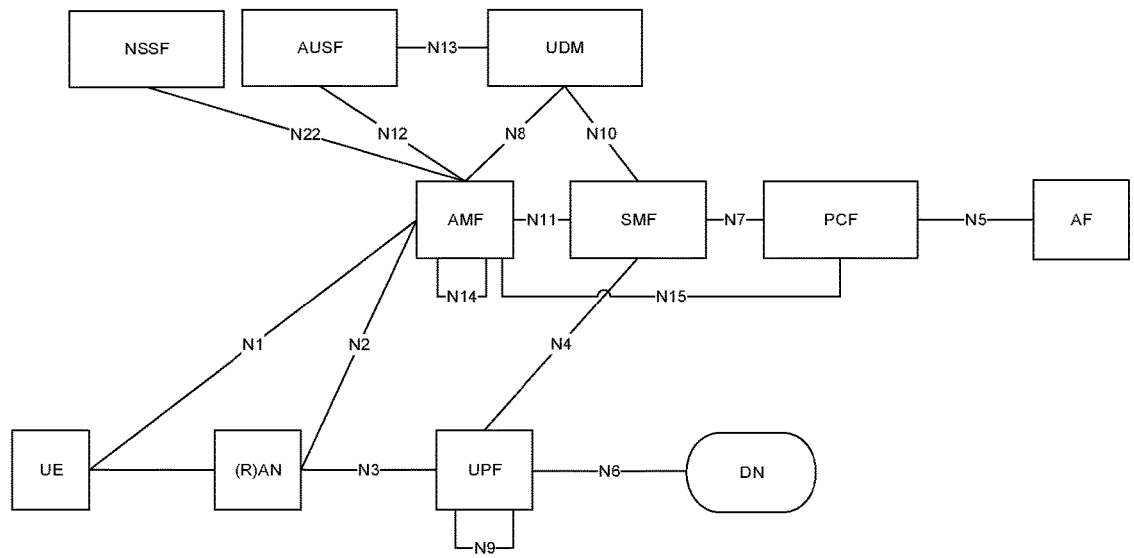
FIG. 1 shows the main network functions of a 5G Core Network according to the prior art.
Figure 2:
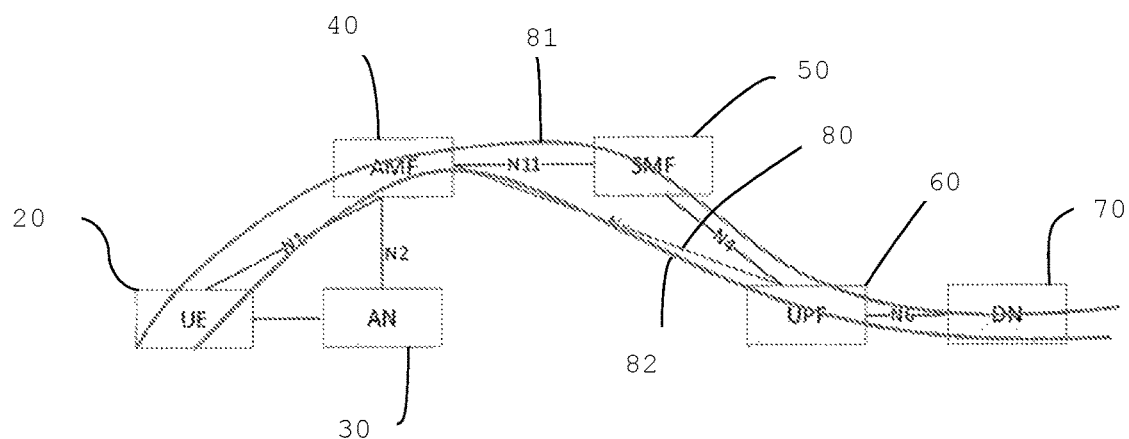
FIG. 2 shows two possible data routes for the transmission of infrequent small data within the core network, according to alternative implementations of the present disclosure.

FIG. 2 illustrates a telecommunication system. The telecommunication system includes a user equipment 20, a radio access network 30, an access and mobility management function 40, and a user plane function 60. The telecommunication system may further include a session management function 50. The telecommunication system may include a plurality of user equipment, access and mobility management functions, session management functions, and user plane functions (not shown).

The telecommunication system can be for example a radio communication system, e.g. a 3GPP system; preferably, the telecommunication system can be a 5G system including a 5G Access Network, AN, (also known as Radio Access Network, RAN), a 5G Core Network and a user equipment, UE. However, the telecommunication system is not limited to this and may be any 3GPP compliant radio communication system specified by 3GPP, or may be a non-3GPP compliant radio communication system.

Specifically, the user equipment, UE, could be a M2M device, an MTC device, a CIoT (Cellular IoT) device, a IoT device or the like. However, the user equipment is not limited to the above cited examples and may be any user equipment configured for use in a telecommunication system.

The Access Network of the telecommunication system includes for example a node AN 30, such as a radio base station, referred to in the following also as RAN 30 (Radio Access Network).

The radio access network 30 may include a plurality of radio base stations.

The Core Network, CN, of the telecommunication system includes the AMF (Access and Mobility Management Function) 40, the SMF (Session Management Function) 50 and the UPF (User Plane Function) 60. As illustrated in FIG. 2, the UPF 60 can be connected to a DN (Data Network) 70, such as for example an IP network or the like. An interface N1 is defined between the UE 20 and the AMF 40. An interface N2 is defined between the AN 30 and the AMF 40. An interface N11 is defined between the AMF 40 and the SMF 50. An interface N4 is defined between the SMF 50 and the UPF 60. An interface N6 is defined between the UPF 60 and the DN 70. Furthermore, as it will be further explained below, according to an implementation of the disclosure, a further interface Nx (reference number 80 in FIG. 2) can be defined between the AMF 40 and the UPF 60.

The disclosure of the present disclosure aims to support infrequent small data transmission via NAS PDU (non-access stratum packet data unit) in the telecommunication system. Infrequent small data is data which is associated to a CIoT (Cellular IoT) devices and/or application. For example, infrequent small data is data transmitted by a UE which realizes one of a CIoT device, a M2M device, a device running a MTC application or the like. For example, infrequent small data is data transmitted or received by a CIoT device. Infrequent small data could, e.g., be transmitted with intervals between successive transmissions (or bursts) of at least 30 seconds; e.g., each transmission could amount to less than 100 bytes. However, also other transmission intervals and amount of transmitted data could be envisaged.

In the present disclosure, the infrequent small data is encapsulated in a NAS (non-access stratum) PDU (packet data unit) and transmitted via N2—AP interface from the UE 20 to the core network, in particular to the AMF 40. In fact, there is no interface GTP—U tunnel over N3 interface (between the AN 30 and the UPF 40) and DRB over Uu interface (between the UE 20 and the AN 30) established for this kind of data transmission. This permits to achieve the transmission of infrequent small data with resource efficient system signalling load (especially over the radio interface).

The NAS PDU encapsulating the small data shall also carry the data related information, PDU session ID or S-NASSI (Single-Network Assistance Slice Selection Information, also referred to as S-NSSAI in the field of telecommunication).

According to an implementation, the NAS PDU is transmitted by the user equipment 20 to the access and mobility management function 40 via the radio access network 30; the NAS-PDU is transmitted by the user equipment 20 to the radio access network 30 as part of an RRC message, in particular a message for establishing an RRC connection. This improves efficiency of the transmission of infrequent small data in the uplink.

As illustrated in FIG. 2, the present inventors devised two possible data routing ways within the core network for the infrequent small data. The first data routing way is routing the infrequent small data between AMF 40 and UPF 60 via SMF transfer, i.e. via the SMF 50. The first data routing way corresponds to route 81 in FIG. 2. The second data routing way is routing the infrequent small data directly via a new interface Nx 80 between the AMF 40 and UPF 60. The second data routing way corresponds to route 82 in FIG. 2.

According to a first implementation of the disclosure, the first data route 81 is used in a method for performing communication in which infrequent small data is transmitted. The first implementation will be described with reference to FIG. 3. In the first implementation, there is no interface between the AMF 40 and the UPF 60. In the first implementation, the telecommunication system may be a 5G system.

Figure 3:
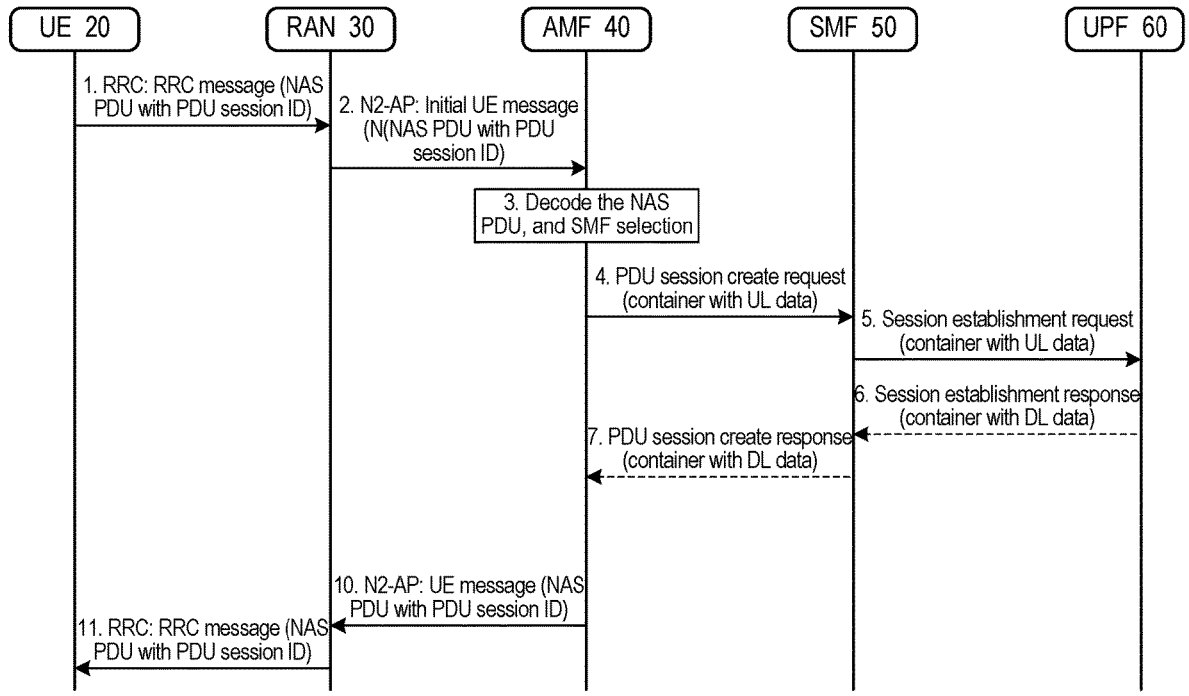
FIG. 3 shows the sequence of messages exchanged between the functions of the core network according to a first implementation of the disclosure.

A method for performing communication according to the first implementation includes the following steps, as shown in FIG. 3:

Steps 1-2: The UE 20 establishes a RRC connection and sends as part of it an integrity protected NAS PDU. Specifically, as shown in FIG. 3, the NAS PDU can be transmitted as part of an RRC message, e.g. a message for establishing an RRC connection. The NAS PDU carries uplink data that include the infrequent small data to be transmitted by the UE. In addition to the uplink data, the NAS PDU may include also PDU Session information; for example, the NAS PDU may carry the PDU Session ID or the S-NASSI. The NAS PDU is transmitted by the UE 20 to the AMF 40 via the RAN 30. In particular, the RAN 30 receives the NAS-PDU in the RRC message from the UE 20 at step 1. At step 2, the RAN 30 forwards the NAS-PDU at step 2 to the AMF 40 as part of an initial UE message on the N2-AP interface.

Step 3: the AMF 40 receives and decodes the NAS PDU; furthermore, upon decoding the NAS PDU, the AMF may select the appropriate SMF based on the PDU Session ID included in the received NAS PDU.

Step 4: If there is no N11 tunnel established for the PDU session or there is no PDU Session established, the AMF 40 initiates the N11 tunnel establishment procedure, carrying the uplink data also PDU Session ID, DNN (Data Network Name) and/or S-NASSI information. In this step, upon decoding the NAS PDU, the AMF 40 transmits a PDU session create request to the SMF 50, wherein the PDU session create request includes at least the uplink data. Preferably, the PDU session create request includes PDU Session ID, DNN and/or S-NASSI information in addition to the uplink data.

Step 5: The SMF 50 performs UPF selection considering the DNN and S-NASSI if needed, and then requests session establishment to the UPF 60, while simultaneously forwarding the uplink data to the UPF 60. In this step, the SMF 50 may transmit a session establishment request to the UPF 60 including the uplink data, upon receiving the PDU session create request from the AMF at step 4.

Step 6: The UPF 60 responds to the SMF 50 and carries the downlink data if available. In this step, the UPF 60 transmits a session establishment response to the SMF 50 which may include downlink data (if downlink data are available), in response to the session establishment request received at step 5.

Step 7: the SMF 50 forwards the downlink data (if present in the session establishment response) to the AMF 40 along with the N11 tunnel establishment response, upon receiving the session establishment response at step 6 from the UPF 60. The message transmitted at step 7 may be referred to also as PDU session create response.

Step 10: the AMF 40 transmits a UE message to the RAN 30 on the N2-AP interface. The UE message includes a NAS PDU including a PDU session ID. The NAS PDU may include the downlink data received from the SMF 50, if present.

Step 11: the RAN 30 transmits an RRC message to the UE 20 including the NAS PDU received from the AMF 40 at step 10.

In the first implementation, the uplink data can be transmitted from the AMF 40 to the SMF 50 during the establishment of the N11 tunnel. This permits to perform an efficient transmission of the infrequent small data. Furthermore, downlink data addressed to the UE can be transmitted during the establishment of the N11 tunnel, which further contributes to improve the transmission of infrequent small data, by reducing overhead.

According to a second implementation of the disclosure, the second data route 82 is used in a method for performing communication in which infrequent small data is transmitted. The second implementation will be described with reference to FIG. 4. In the second implementation, an interface Nx 80 between the AMF 40 and the UPF 60 is provided. In the second implementation, the telecommunication system may be a 5G system.

Figure 4:
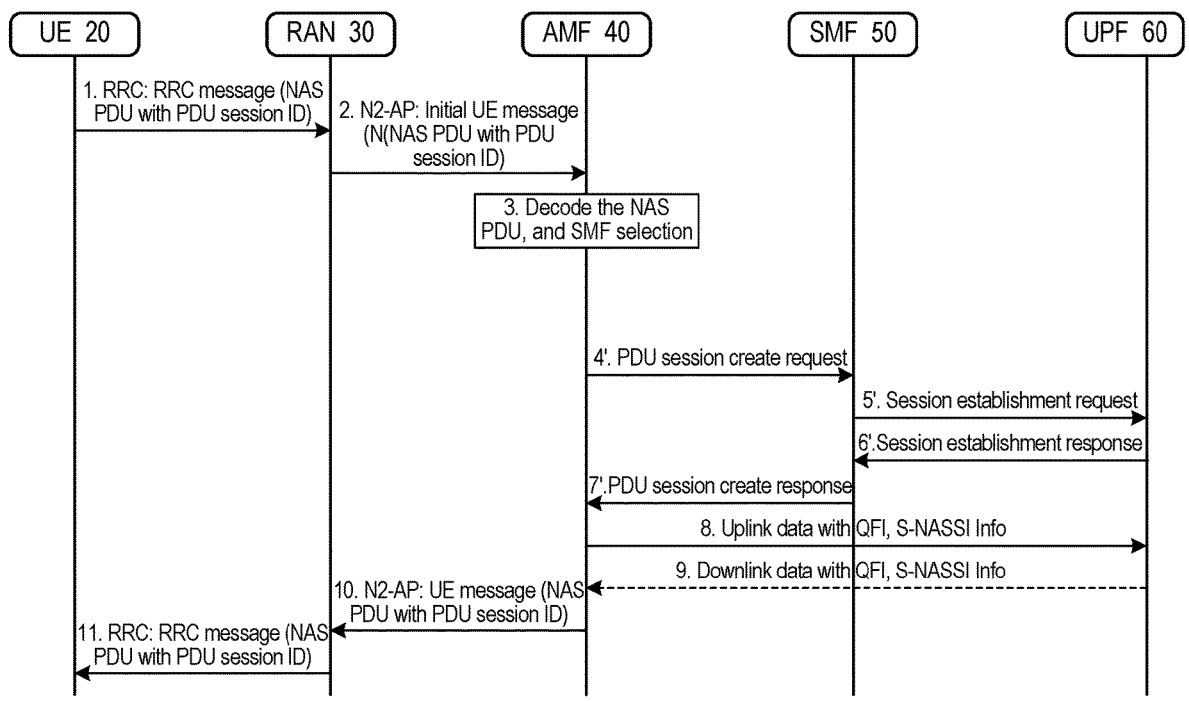
FIG. 4 shows the sequence of messages exchanged between the functions of the core network according to a second implementation of the disclosure.

A method for performing communication according to the second implementation includes the following steps illustrated in FIG. 4:

Steps 1-3: these steps are performed in the same manner as steps 1-3 described for the first implementation with reference to FIG. 3;

Step 4': the AMF 40 requests the SMF 50 to establish the user plane tunnel between AMF 40 and UPF 60 for the PDU Session, and provides the AMF address and the TEID information for the downlink data forwarding. In this step, the AMF 40 transmits a PDU session create request to the SMF 50 including the AMF address and the TEID information for the downlink data forwarding, upon receiving and decoding the NAS PDU at step 3.

Step 5': The SMF 50 establishes the tunnel for the PDU Session and provides the AMF address and DL TEID information to the UPF 60. In this step the SMF 50 transmits a session establishment request to the UPF 60 upon receiving the PDU session create request at step 4', wherein the session establishment request carries the AMF address and DL TEID information as received from the AMF 40.

Step 6': the UPF 60 provides the UL TEID information to the SMF 50. In this step the UPF 60 transmits a session establishment response to the SMF 50 in response to the session establishment request received at step 5'. The session establishment response transmitted by the UPF 60 includes the UL TEID information.

Step 7': the SMF 50 responds to the AMF 40 by transmitting the TEID information of the UPF 60. In this step the SMF 50 transmits a PDU session create response including the UPF TEID information to the AMF 40, upon receiving the session establishment response from the UPF 60 in step 6'.

Step 8: The UL data are transmitted over the tunnel between AMF 40 and UPF 60 over the Nx interface. Specifically, the uplink data including the infrequent small data are transmitted from the AMF 40 to the UPF 60, after the AMF receives the PDU session create response from the SMF at step 7'. In this step, the uplink data might be transmitted together with QFI (QoS Flow Identity) and S-NASSI information.

Step 9: Optional downlink data is transmitted over the tunnel between AMF 40 and UPF 60 over the Nx interface, if downlink data are available at the UPF 60. In this step, the DL data might be transmitted together with QFI (QoS Flow Identity) and S-NASSI information.

Steps 10-11: these steps are performed in the same manner as steps 10-11 described for the first implementation with reference to FIG. 3.

In the second implementation, upon receiving the uplink data in the NAS PDU, the AMF 40 starts a procedure for establishing a Nx tunnel over the Nx interface between the AMF 40 and the UPF 60. Upon establishing the Nx tunnel, the infrequent small data can be transmitted over the Nx interface to the UPF 60, thereby achieving efficient small data transmission.

Figure 5:
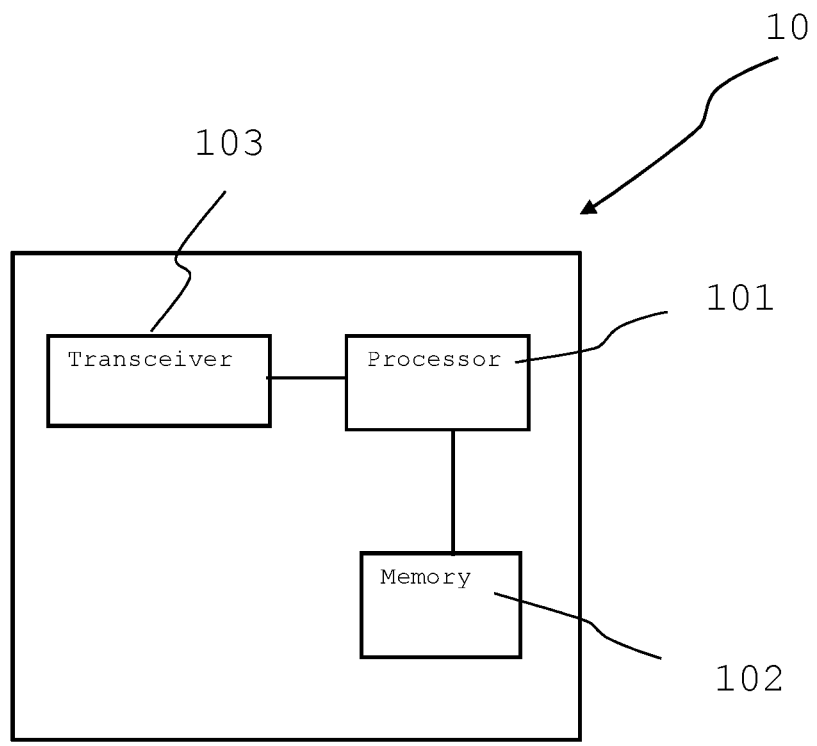
FIG. 5 shows an implementation of an apparatus implementing a network function and/or a user equipment and/or a radio base station.

FIG. 5 is a schematic diagram of an exemplary apparatus 10 usable in implementations of the disclosure for implementing one of the AMF, SMF or UPF as above described.

As illustrated, apparatus 10 includes a processing unit 101, a memory 102, and a transceiver 103. Processing unit 101 may include a processor, a microprocessor, or processing logic that may interpret and execute instructions. The memory 102 may include a random-access memory (RAM) or another type of dynamic storage device that may store information and instructions for execution by processing unit 101 and/or any type of static storage device that may store static information and instructions for use by the processing unit 101. The transceiver 103 may include any circuit that enables apparatus 10 to communicate with other devices and/or systems (such as with communication terminals or other network nodes). The apparatus 10 may perform certain operations or processes described above for any of the access and mobility management function 40, the session management function 50 and a user plane function 60. In particular, the apparatus may perform these operations in response to processing unit 101 executing software instructions contained in the memory 102. The memory 102 may also include a computer-readable medium. A computer-readable medium may be defined as a physical or a logical memory device. For example, a logical memory device may include memory space within a single physical memory device or distributed across multiple physical memory devices.

The software instructions of a computer program contained in the memory 102 may cause the processing unit 101 to perform operations or processes described herein. Alternatively, hardwired circuitry may be used in place of or in combination with software instructions to implement processes and/or operations described herein. Thus, implementations described herein are not limited to any specific combination of hardware and software.

An apparatus 10 may also be replace by a distributed system of plural apparatuses cooperating for implementing the functions as described herein. In other words, the functions of each of the AMF 40, SMF 50 and/or UPF 60 may be performed by pieces of software executed by a distributed computer system including a plurality of apparatuses. Furthermore, the physical resources of apparatuses performing the functions of the AMF, SMF and/or UPF may be dynamically allocated and changed over time.

The apparatus 10 may also be used to implement the user equipment 20 and/or a node of the RAN 30 (such as a radio base station) as described above.

Any one of the above-referred units of a network node or function may be implemented in hardware, software, field-programmable gate array (FPGA), application-specific integrated circuit (ASICs), firmware, and a mixture of the above.

In further implementations of the disclosure, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Thanks to the method, the system and the computer programs described above, it is possible to achieve a transmission of infrequent small data in a mobile communication system with resource efficient system signalling load (especially over the radio interface), a satisfactory level of security mechanisms for CIoT in 5G system and reduced level of power consumption for UEs used for CIoT in 5GS system.

Although the present disclosure has been described on the basis of detailed examples, the detailed examples only serve to provide the skilled person with a better understanding, and are not intended to limit the scope of the disclosure. The scope of the disclosure is much rather defined by the appended claims.

The invention claimed is:
1. A method of performing communication in a telecommunication system including a user equipment, a radio access network, an access and mobility management func- tion and a user plane function, comprising the steps of: at the access and mobility management function, receiving from the user equipment a Non-Access Stratum (NAS) packet data unit, MU, carrying uplink data, wherein the uplink data includes infrequent small data: at the access and mobility management function, after receiving NAS message from the user equipment, transmitting the uplink data, to the user plane function, wherein the NAS PDU encapsulates a PDU session ID or Single-Network Assistance Slice Selection Information, S-NASSI, wherein the access and mobility management function transmits the uplink data to the user plane function via an interface (Nx) between the access and mobility management function and the user plane function, wherein the access and mobility management function transmits the uplink data, to the user plane function via a session management function of the telecommunication system, wherein, upon receiving the NAS PDU from the user equipment, the access and mobility management function transmits a PDU session create request to the session management function, wherein the PMU session create request includes the uplink data, wherein the PDU session create request contains the PDL session ID, Data Network Name, DNN, and/or Single-Network Assistance Slice Selection Information, S-NASSI, and wherein, when receiving the PDU session create request including the DNN and the S-NASSI, the session management function selects the user plane function based on the DNN and the S-NSSAI.

2. The method according to claim 1, wherein the NAS PDU is transmitted by the user equipment to the access and mobility management function via the radio access network, the NAS-PDU being, transmitted by the user equipment to the radio access network as part of a Radio Resource Control (RRC) message.

3. The method according to claim 1, wherein the NAS PDU includes a PDU session ID and the access and mobility management function, upon receiving the NAS PDU, selects a session management function of the telecommunication system based on the PDU session ID.

4. The method according to claim 1, wherein, upon receiving the PDU session create request, the session management function transmits a session establishment request to the user plane function and simultaneously forwards the uplink data to the user plane function.

5. The method according to claim 4, wherein, upon receiving the session establishment request, the user plane function transmits a session establishment response carrying downlink data to the session management function, if downlink data are available.

6. The method according to claim 5, wherein, upon receiving the session establishment response, the session management function transmits a PDU session create response carrying the downlink data to the access and mobility management function, if the downlink data are carried in the session establishment response from the user plane function.

7. The method according to claim 1, wherein, upon receiving the NAS PDU from the user equipment, the access and mobility management function transmits to a session management function of the telecommunication system a PDU session create request to establish a user plane tunnel for a PDU session between the access and mobility management function and the user plane function, and wherein the session management function, upon receiving the PDU session create request, establishes a tunnel for a PDU session between the access and mobility management function and the user plane function.

8. The method according to claim 7, wherein the PDU session create request includes an Access and Mobility Management Function (AMF) address and Downlink (DL) Tunnel Endpoint identifier (TED) information, the method further comprising the steps of: at the session management function, upon receiving the PDU session create request, transmitting the AMP address and the DL TEID to the user plane function, at the user plane function, in response to receiving the AMF address and the DL TEID from the session management function, transmitting a Uplink (UL) TEID of the user plane function to the session management function, and at the session management function, upon receiving the UL TEID from the user plane function, transmitting the UL TEID to the access and mobility management function.

9. The method according to claim 8, wherein, upon receiving the UL TEID from the session management function, the access and mobility management function transmits the uplink data to the user plane function over the established tunnel for a PDL; session between the access and mobility management function and the user plane function.

10. The method according to claim 1, wherein the telecommunication system is a 5G system.

11. A system including an access and mobility management function and a user plane function, wherein the access and mobility management function and the user plane function are configured to perform the method according to claim 1.

12. The system according to claim 11 further including a session management function, wherein the access and mobility management function, the session management function and the user plane function are configured to perform the method of claim 3.

13. A non-transitory computer readable storage medium, comprising a set of computer programs that, when executed by one or more processing apparatuses, causes said one or more processing apparatuses to perform a method according to claim 1.

* * * * *